Sept. 2, 1958    M. M. SALVADOR    2,850,591
DEVICE FOR OPERATING THE HORN OF MOTOR CARS
Filed Oct. 17, 1956

INVENTOR:
Miguel Muñoz Salvador
BY: Michael S. Striker
Agt.

United States Patent Office 2,850,591
Patented Sept. 2, 1958

2,850,591

DEVICE FOR OPERATING THE HORN OF MOTOR CARS

Miguel Munoz Salvadore, Madrid, Spain

Application October 17, 1956, Serial No. 616,511

2 Claims. (Cl. 200—61.57)

The present invention relates to a device for operating the horn of motor cars, and more particularly to a steering wheel and horn switch assembly.

The present application is a continuation-in-part application of the application No. 205,635, filed January 12, 1951, and issued October 23, 1956, as Patent No. 2,768,257.

In steering wheel and horn switch assemblies according to the prior art the operating member for sounding the horn is usually located at the center of the steering wheel or it has the form of a ring coaxially arranged with the steering wheel and placed inwardly thereof. All these constructions have the disadvantage that they necessitate the operator to remove at least one hand from the steering wheel or release his grasp of the steering wheel in order to operate the switch of the horn. The horn is usually sounded only in dangerous situations and the necessity of removing one hand from the steering wheel or of releasing the tight grip of this wheel has often a very detrimental effect on the proper steering of the car during this critical situation.

It is one object of the present invention to overcome this disadvantage of constructions of the prior art.

It is a further object of the present invention to provide for a steering wheel and horn switch assembly by means of which the horn can be sounded without removing the hand from the steering wheel or releasing the tight grip on the same.

It is yet an additional object of the present invention to provide for such a steering wheel and horn switch assembly which is constructed from relatively few and simple parts which can be manufactured at relatively little cost and which will perform troublefree over a long period of time.

With these objects in view the steering wheel and horn switch assembly according to the present invention comprises a steering wheel formed with a peripheral groove, first contact means extending around the groove and being located in the interior thereof, operating means distributed about the steering wheel and being located in the groove spaced from and opposite the first contact means, a portion of the operating means extending outwardly of the groove and the operating means being movable toward and away from the first contact means, holding means fixed to the steering wheel for limiting the movement of the operating means away from the first contact means, resilient means located in the groove between the first contact means and the operating means and urging the operating means away from the first contact means in abutting relationship with the holding means, second contact means fixed to the operating means, projecting toward and being spaced from the first contact means, whereby a circuit including the first and second contact means may be closed by moving the operating means against the force of the resilient means until the second contact means contact the first contact means.

According to a preferred embodiment of the present invention the peripheral groove formed in the steering wheel extends into the same from the inner periphery thereof and has preferably a rectangular shape so that the operating means slidably arranged in the groove for movement toward and away from the first contact means are guided during the movement thereof by the two annular side faces of the groove.

Preferably the operating means are formed from a plurality of curved operating members, evenly distributed spaced from each other about said steering wheel, and located in the groove spaced from and opposite the first contact means. One or more contact members are respectively fixed to each of the operating members and each of the contact members has a projecting portion projecting toward and being spaced from the first contact means. The resilient means located in the groove between the first contact means and the operating members are preferably formed from electrically conductive spring material and are connected to the contact members and to each other so that all contact members fixed to the operating members are electrically connected. To prevent short circuiting the first and second contact means through these electrically conductive springs an insulating strip is provided on the surface of the first contact means facing the contact members or second contact means and this insulating strip is formed with a plurality of openings respectively located opposite the projecting portions of the second contact means or contact members, so that a closed circuit between said first contact means and said plurality of second contact means may be established by moving the operating means against the force of the springs until the second contact means contacted the first contact means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
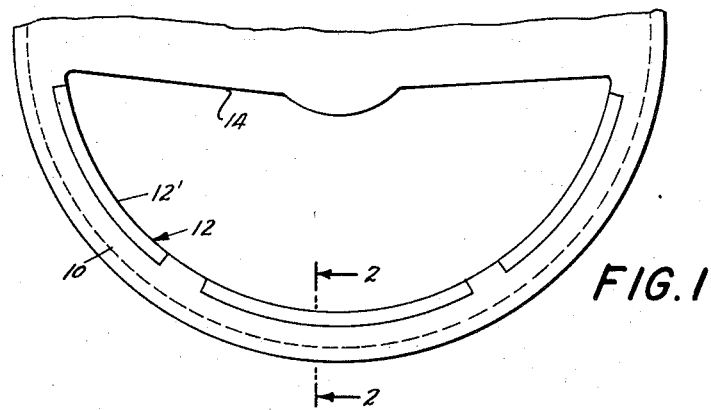
Fig. 1 is a partial, schematic plan view of the steering wheel and horn switch assembly according to the present invention.
Figures 2, 2A, 2B, 2C:
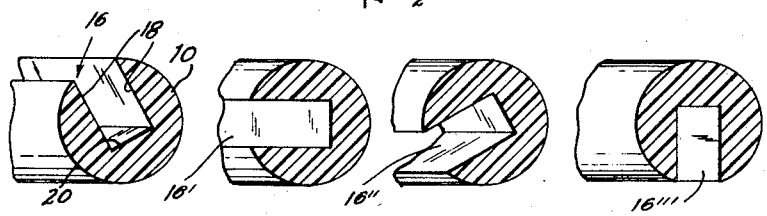
Fig. 2 is a section through the steering wheel alone, taken along the line 2—2 of Fig. 1 and viewed in the direction of the arrows. This figure shows one arrangement of the groove in the steering wheel.
Figs. 2a–2c are sections similar to the sections shown in Fig. 1 and showing different arrangements of the groove in the steering wheel.

Referring now to the drawings, and more particularly to Fig. 1 of the same, it will be seen that the steering wheel 10 of the present invention is provided with an arm 14 by means of which the steering wheel is attached in the usual manner to a steering post, not shown in the drawings. The steering wheel is formed, as best shown in Fig. 2 with a peripheral groove 16 extending inwardly into the wheel 10 from the inner periphery thereof and being upwardly inclined to the horizontal plane of symmetry through the steering wheel. Groove 16 is defined by two annular side faces 18 and an annular end face 20. Instead of being upwardly inclined to the horizontal plane of symmetry through the wheel 10, the groove may be formed parallel and symmetrically arranged to the plane of symmetry through the wheel as the groove 16' shown in Fig. 2a, or the groove may be downwardly inclined to the plane of symmetry as the groove 16" shown in Fig. 2b. Another modification is shown in Fig. 2c in which the groove 16''' is shown normal to the plane of symmetry through the wheel 10.

Figure 3:
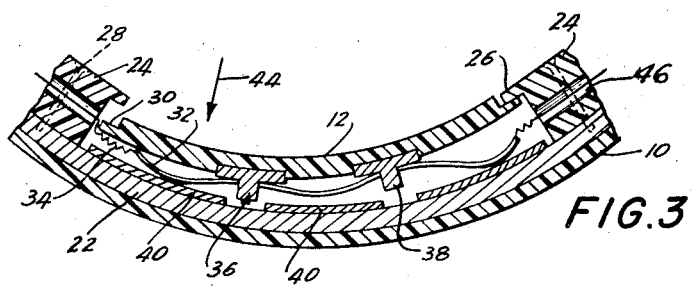
Fig. 3 is a partial cross-section taken along a horizontal plane of symmetry of the steering wheel.
Figure 4:
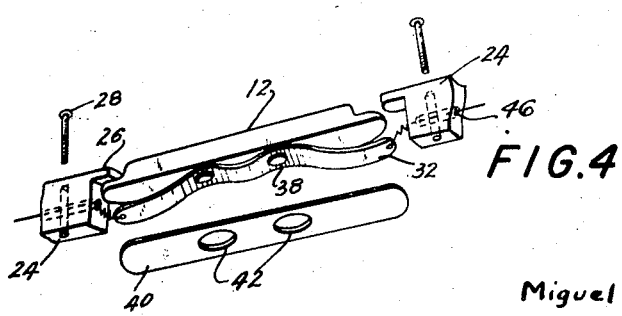
Fig. 4 is an exploded view showing the parts of the horn switch assembly which are to be mounted in the steering wheel.

First contact means 22, in the form of a closed metallic ring, are located in the interior of the groove 16 with the outer face of the ring abutting against the annular end face 20 of the groove and the inner face of the ring facing the open end of the groove. Operating means 12 are distributed about the steering wheel 10 and are located in the groove 16 spaced from and opposite the first contact means 22. These operating means 12 are preferably formed from a plurality of curved operating members as best shown in Figs. 3 and 4 which are evenly distributed, spaced from each other, about the steering wheel 10. Each of the operating members 12 has a portion 12' extending, in the normal position of the operating member 12, outwardly of the groove 16 and the side faces of the operating members 12 are in sliding contact with the side faces 18 of the groove for guiding the operating members 12 for movement toward and away from the first contact means 22. Each of the operating members 12 is provided on opposite ends thereof with cutouts 30. T-shaped holding members 24, fastened to the first contact means 22 for instance by screw 28, or in any other convenient manner, are located in the spaces between adjacent operating members 12. Each of the holding members 24 is provided with laterally extending arms 26 which engage, respectively, adjacent operating members at the cutout end portions thereof to limit the movement of the operating members 12 away from the first contact means 22. Resilient means 32, preferably in the form of metallic springs as shown in Figs. 3 and 4, are located in the groove 16 between the first contact means 22 and the operating members 12. The resilient means or spring 32 urge the operating member 12 away from the contact ring 22, and the lateral arms 26 abutting repectively against the cutout portions 30 of the members 12 limit the movement of the members 12.

Each of the operating members 12 carries at the face thereof facing the contact ring 22 second contact means or contact members 36. As shown in Fig. 3, the second contact means, fixed to each operating member 12, consists of two T-shaped members 36. Members 36 may be fastened to the operating members 12 in any convenient way, for instance by molding the members 36 as inserts into the operating members 12 during the molding of the latter or by cementing. Each of the contact members 36 has a projecting portion 38 projecting from the operating members 12 toward the contact ring 22. The spring members 32 are respectively electrically connected to the contact members 36 and the free ends of these springs 32 are connected to adjacent springs by conductors 34 soldered or otherwise connected to the free ends of the springs 32. In this way all the contact members 36 are connected to each other and form a closed circuit which forms one pole of the switch assembly. The other pole of the switch assembly is formed by the contact ring 22. The holding members 24 are provided with holes 46 through which the conductors 34 lead from one spring member 32 to the adjacent spring member. To prevent that the two poles of the switch are short-circuited by the springs 32, an insulating strip 40 is provided on the inner face of the contact ring 22 facing the operating members 12. The curved portions of the springs 32 abut therefore not against the contact ring 22, but against the inner face of the insulating strip 40. The insulating strip 40 is provided with openings 42 respectively located opposite the projecting portions 38 of the contact members 36.

The steering wheel 10, the operating members 12 and the holding members 24 are made, preferably by molding, from insulating material so that these parts can be easily and relatively cheaply manufactured. The groove 16 may be directly molded in the steering wheel 10 or machined into the wheel after molding of the same.

Instead of forming the resilient means from electrically conductive springs any other resilient material may be used to urge the operating members 12 away from the first contact means 22. If non-conductive material is used the conductors 34 extend from one of the contacting members 36 to the contact members adjacent thereto to connect all the contact members 36 electrically to each other.

The steering wheel and horn switch assembly as described above, will operate as follows:

In the normal position of the assembly, the resilient means 32 located in the groove 16 between the contact ring 22 and the operating members 12 will urge the operating members 12 away from the first contact means or contact ring 22 in abutting relationship with the holding members 24. The arms 26 of the holding member engaging into the cutout portions of the holding member 12 will limit the movement of the operating member 12 away from the first contact means 22. In this position the projecting portion 38 of the second contact means 36 are spaced from the contact ring 22. If the operator wants to sound the horn, all he has to do is to press in a direction as indicated by the arrow 44 against the portion 12' of any of the operating members 12 to move thereby this operating member 12 against the force of the resilient means 32 until one of the second contact means 36 contacts with it projecting portion 38 the first contact means 22. Thereby a circuit between the first and the second pole of the switch is closed and the horn is sounded. It will be noted that, during the sounding of the horn, the operator has not to release his grip on the steering wheel, on the contrary, the switch for the horn is operated by tightening the grip on the steering wheel. Any dangerous situation resulting from releasing the grip of the steering wheel is therefore avoided with the construction according to the present invention.

It will be understood that each of the elements described above, or two or more together, may also find a useful application in other types of devices for operating the horn of motor cars differing from the types described above.

While the invention has been illustrated and described as embodied in steering wheel and horn switch assembly, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A steering wheel and horn switch assembly comprising, in combination, a steering wheel formed with a rectangular peripheral groove extending into the wheel from the inner periphery thereof, said groove being defined by two annular side faces and one annular end face; first contact means located in said groove and having an outer face abutting against said annular end face of said groove; a plurality of curved operating members evenly distributed spaced from each other about said steering wheel, and being located in said groove spaced from and opposite said first contact means, each of said operating members being made from insulating material and having a portion extending outwardly of said groove and having faces in sliding contact with said side faces of the groove for guiding said operating members for movement toward and away from said first contact means; a plurality of T-shaped holding members being fixed to said steering wheel and being respectively located in the spaces between adjacent operating members, each of said holding members having lateral projecting arms engaging into cutouts of adjacent operating members for limiting the movement of said operating members away from said first contact means, said holding members being formed from insulating material; a plurality of second contact means respectively fixed to said operating members and having each a projecting portion projecting toward and being spaced from said first contact means; an insulating strip wound about the inner face of said first contact means and being formed with a plurality of openings respectively located opposite said projecting portions of said second contact means; and a plurality of electrically conductive flat springs of wavy configuration being located in said groove between said second contact means and said insulating strip and having contact portions abutting against said plurality of second contact means for electrically connecting said plurality of second contact means, said springs being formed at each of said contact portions with an opening through which said projecting portions of said second contact means respectively project, and said springs abutting between said projecting portions of said second contact means against said insulating strip for urging said operating members away from said first contact means, whereby a circuit including said first and second contact means may be closed by moving said operating members against the force of said springs until said second contact means contacts said first contact means.

2. A steering wheel and horn switch assembly comprising, in combination, a steering wheel formed with a peripheral groove extending into the wheel from the inner periphery thereof; first contact means extending around said groove and being located in the interior thereof; operating means distributed about said steering wheel and being located in said groove spaced from and opposite said first contact means, a portion of said operating means extending outwardly of said groove and said operating means being movable toward and away from said first contact means; holding means fixed to said steering wheel for limiting the movement of said operating means away from said first contact means; a plurality of second contact means respectively fixed to said operating means and having each a projecting portion projecting toward and being spaced from said first contact means; an insulating strip wound about said first contact means and facing said operating means and being formed with a plurality of openings respectively located opposite said projecting portions of said second contact means; and a plurality of electrically conductive spring members located in said groove between said second contact means and said insulating strip and having contact portions spaced from said insulating strip and abutting against said plurality of second contact means for electrically connecting said plurality of second contact means, said spring members being formed at each of said contact portions with an opening through which said projecting portions of said second contact means respectively project, and said spring members abutting between said projecting portions of said second contact means against said insulating strip for urging said operating means away from said first contact means, whereby a circuit including said first and second contact means may be closed by moving said operating means against the force of said spring members until said second contact means contacts said first contact means.

References Cited in the file of this patent

UNITED STATES PATENTS

| | | |
|---|---|---|
| 1,345,259 | Saurage | June 29, 1920 |
| 1,373,496 | Frecheville | Apr. 5, 1921 |
| 1,745,615 | Hamer | Feb. 4, 1930 |
| 1,913,855 | Pohjola | June 13, 1933 |
| 2,025,980 | Getty | Dec. 31, 1935 |
| 2,025,981 | Getty | Dec. 31, 1935 |
| 2,304,546 | Cox | Dec. 8, 1942 |
| 2,796,484 | Wolf | June 18, 1957 |